Jan. 12, 1943.　　　F. H. DARRAGH, JR　　　2,308,327
WATER TRACTOR
Filed April 11, 1940　　　2 Sheets-Sheet 1
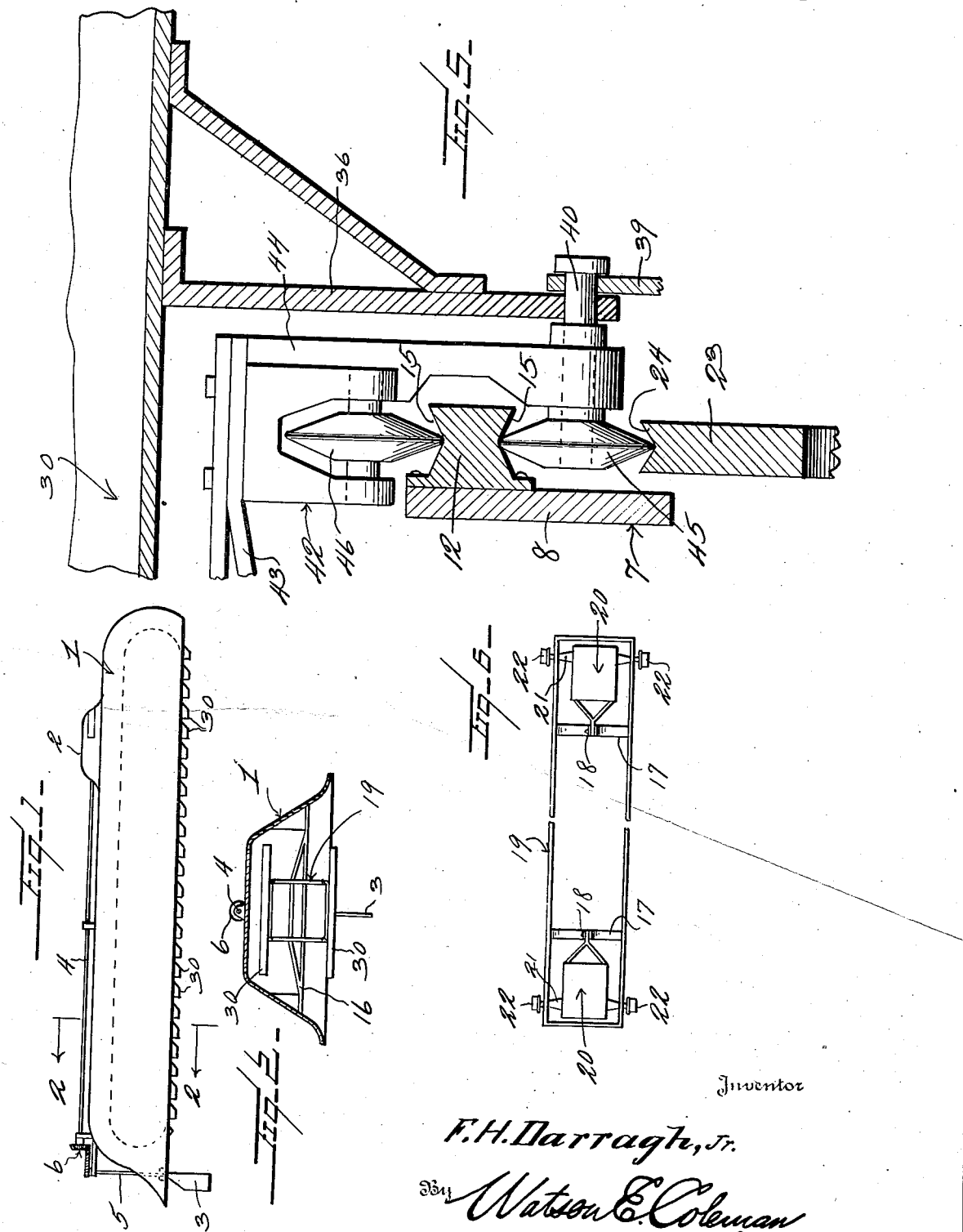
Inventor
F. H. Darragh, Jr.
By Watson E. Coleman
Attorney

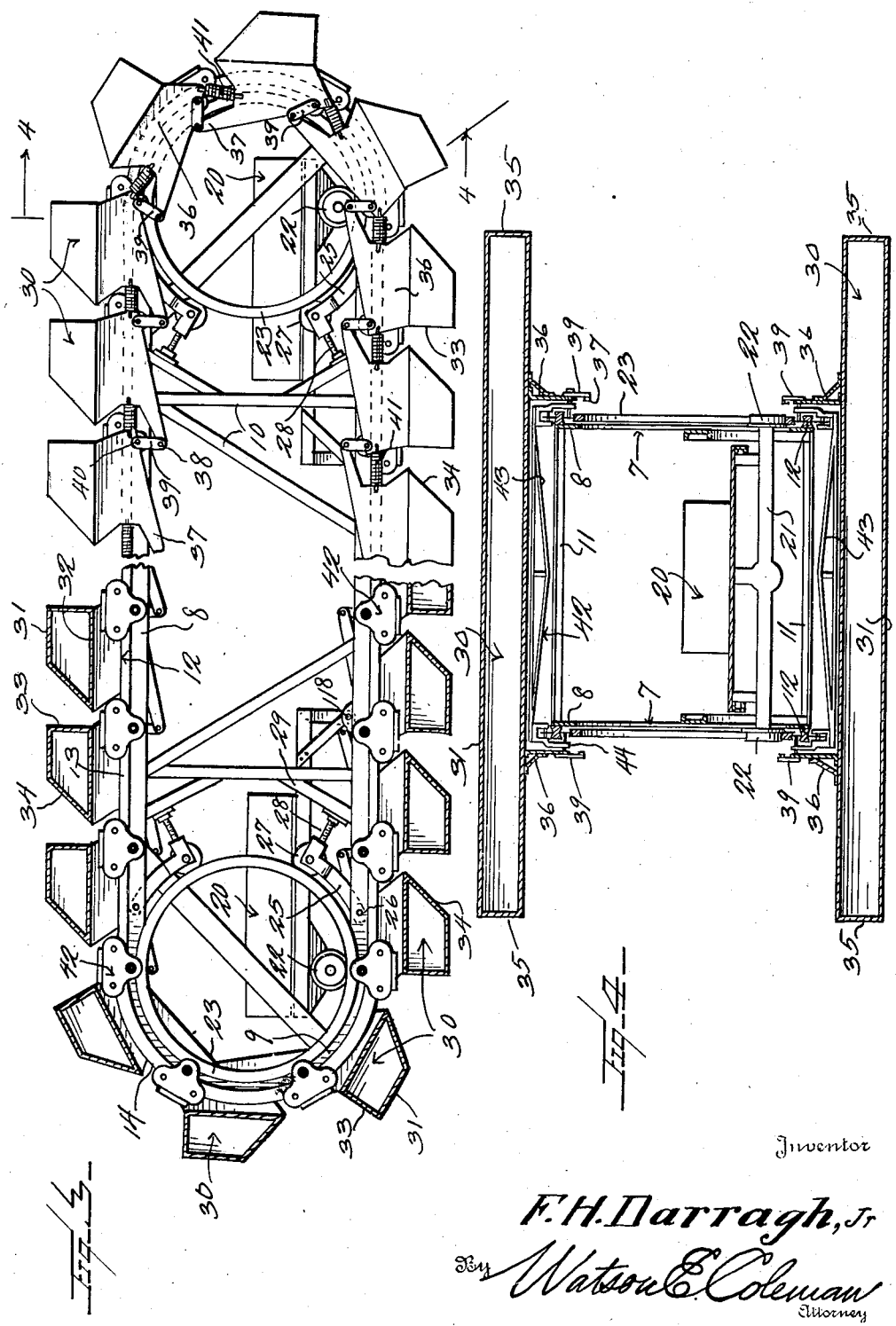

Patented Jan. 12, 1943

2,308,327

UNITED STATES PATENT OFFICE 2,308,327

WATER TRACTOR

Frank Hart Darragh, Jr., Beaver Falls, Pa.

Application April 11, 1940, Serial No. 329,169

11 Claims. (Cl. 180—9.1)

This invention relates to improvements in water traversing structures and pertains particularly to an improved tractor type of water vehicle.

The present invention has for its primary object to provide an improved water tractor employing buoyant bodies, which are progressively moved in the manner of a caterpillar tread, wherein a novel means is employed for transmitting the necessary motion to said buoyant bodies so that such motion will be smooth and at the same time the bodies can be made to progress at any desired speed.

Another object of the invention is to provide a water tractor employing a pair or more of spaced parallel endless tracks along which buoyant bodies are moved, wherein a novel power transmitting mechanism is provided for transferring motive power from a drive source to wheeled coupling units which connect the buoyant bodies together and which are supported to move on the track.

A further object of the invention is to provide a water tractor employing an endless tread made up of a number of buoyant bodies and endless tracks for supporting such tread wherein a novel coupling arrangement is employed between the buoyant bodies of the tread which also provides a means for supporting the tread upon the endless tracks so that the buoyant bodies of the tread may be caused through an applied motive force, to progress smoothly along the tracks longitudinally of the structure of which the tread forms a part.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of a water tractor constructed in accordance with the present invention and showing in elevation a portion of the endless tread.

Fig. 2 is a diagrammatic cross-sectional view taken substantially on the line 2—2 of Fig. 1.

Fig. 3 is a view partly in side elevation and partly in longitudinal section of the tractor structure without the enclosing housing and steering means shown in Fig. 1.

Fig. 4 is a sectional view on the line 4—4 of Fig. 3.

Fig. 5 is a detailed sectional view on an enlarged scale illustrating the connection between a track and the carrying means for a buoyant body.

Fig. 6 is a diagrammatic view in plan of the track supporting frame showing the manner of mounting the engines or driving units in the ends of the frame.

In Fig. 1 there is illustrated in a diagrammatic manner, a streamlined hull such as might be employed in connection with the tractor structure of the present invention for the construction of a ship. This hull structure is generally indicated by the numeral 1 and as shown in the cross-sectional view of Fig. 2, it is open upon its underside. The numeral 2 designates a pilot house, the structure of Fig. 1 constituting a towing vessel or similar structure such as a tug or the like, and for this reason no other super structure is illustrated.

The numeral 3 designates a steering rudder and the numerals 4 and 5 indicate operatively connected control rods for the rudder, one of which leads from the pilot house 2, the rods being here shown as connected by gears 6.

Fig. 2 diagrammatically illustrates the manner in which the water tractor structure might be disposed within the hull 1, the details of construction of this tractor being set forth particularly in Figs. 3, 4 and 5.

As shown in Fig. 4, the water tractor structure comprises the two relatively long spaced parallel side units 7, each of which has the upper and lower parallel rails 8 which are joined at the two ends of the unit by the semicircular end portions 9. The rails 8 are braced by the bars 10, which extend vertically between the upper and lower sides of the unit and transverse horizontal bars 11 extend between the two units 7 to maintain the same in spaced parallel relation and thereby producing a long horizontally disposed buoyant body supporting frame which is housed within the hull 1.

To the outer side of each of the units 7 there is secured an endless track indicated generally by the numeral 12 and having the top and bottom parallel rails 13 connected together by the semi-circular end portions 14, thus producing upon the outer side of each frame unit 7, an endless track for the purpose hereinafter stated. Each of these tracks has its inner and outer surfaces provided with a groove or channel 15, as shown in Fig. 5, these channels being continuous upon the two inner and outer faces of the track or, in other words, upon the oppositely directed horizontal sides of the track.

The frame structure may be secured within the hull 1 for the support of the latter on the frame by the provision of suitable transverse beams 16, shown in Fig. 2, which extend through the frame and are secured thereto in any suitable manner. These beams are not illustrated in the detailed illustration of the tractor structure as given in Figs. 3 to 5 inclusive.

Each of the semi-circular end portions of the two continuous tracks is of slightly greater thickness between the grooves or channels 15 than the horizontally extending upper and lower runs 13, for the purpose hereinafter explained.

Extending transversely within the track frame structure adjacent each end as illustrated diagrammatically in Fig. 6, is a carriage frame 17 at the transverse center of which is a horizontal pivot bearing 18. Disposed between each carriage 17 and the adjacent end of the track frame, which frame is here designated, for convenience, generally by the numeral 19, is a motor or driving unit which is diagrammatically illustrated and indicated generally by the numeral 20. Such unit may comprise an internal combustion engine such as might be employed in a motor vehicle, with which is connected a driving axle, not shown, enclosed within a transverse housing 21, the axle within the housing carrying at its remote ends flanged driving wheels 22. It will also be readily appreciated that instead of an internal combustion engine driving unit, an electric motor may be employed if desired, or if found more satisfactory.

Arranged concentrically within each semi-circular end portion 14 of each endless track is a driving ring 23 which is peripherally grooved, as indicated at 24 in Fig. 5. The grooved periphery of each ring is in spaced relation with the inner groove 15 of the track through the adjacent circular end portion of such track, as is clearly shown in Fig. 3, being held in this position with respect to the track by certain wheels of the buoyant element supporting units hereinafter described.

Adjacent each driving ring 23 upon the side thereof opposite the adjacent curved portion 14 of a track, are two positioning units, each of which comprises an arm 25 which is pivotally connected, as at 26, with the adjacent rail 8 of a frame unit 7, each of these arms extending inwardly toward the center of the space between the rails 8 and substantially following the curvature of the adjacent driving ring and carrying upon its free end an idler roller 27 which engages the grooved periphery of the adjacent ring. An adjusting screw 28 is threadably joined with the roller carrying end of the arm 25 and engages at its end remote from the arm 25 with a suitable fixed support or brace 29, so that by turning the screw, the roller 27 can be caused to swing toward or away from the adjacent ring 23.

Extending transversely of the frame structure 19 is a plurality of tread bodies 30 here shown as being in the form of buoyant pontoons. These bodies are provided with inner and outer parallel walls 31 and 32, respectively, and each has a vertical forward wall 33 connecting the inner and outer walls and a sloping rear or trailing wall 44 connecting the inner and outer walls. The ends or lateral sides of the pontoons are, of course, closed by walls 35. Each of these tread bodies or pontoons has secured transversely of the inner wall 32 two wing plates 36 which are spaced apart sufficiently to receive therebetween the two side units 7 of the frame. Each of these wing plates has a tail piece 37 extending obliquely of the path of travel of the pontoon and inwardly with respect to the adjacent side unit and pivotally attached, as at 38, to the inner end of each tailpiece is one end of a link 39, the other end being pivotally attached, as indicated at 40, to the forward end edge of the wing plate 36 of the next rear pontoon. In other words, the ends of the tailpieces of the pontoon wings extend backwardly with respect to the direction of travel of the pontoons into spaced relation with the forwardly traveling edge of the wing of the following pontoon and is connected thereto by the coupling link 39. Between the adjacent edges of the pontoon wing plates 36 are connected contractile springs 41 which tend to draw the pontoons together to maintain all of them in a fixed spaced relation.

Extending transversely of the frame structure between the frame and each of the pontoons is a supporting truck indicated generally by the numeral 42 and each of these trucks comprises a beam 43 to each end of which is fixed an inwardly extending plate 44 which extends across the outer side of a track 12. Each truck plate has a pivot pin 40 extending therethrough and rotatably supported thereby and upon the inner end of each of these pivot pins 40 is mounted a driven roller 45, which is peripherally sharpened or ridged, as shown in Fig. 5, to engage in the groove 15 upon the inner side of the adjacent track and also to engage in the groove 24 of each of the drive rings 23 associated with the adjacent track.

The plates 36 through their connection with the pins 40 support the pontoons or buoyant bodies 30 from the trucks as is clearly shown in Figs. 4 and 5.

Each truck plate 44 also carries two rotatably supported buoyant body supporting rollers 46 which are in the same plane as the driven roller 45 of the attached plate and are spaced therefrom a distance equal to the thickness of the track whereby to engage at their peripheries, which are ridged or sharpened as shown in Fig. 5, in the groove 15 upon the outer side of the adjacent track.

It will be seen from the foregoing that the driven rollers constantly engage the inner sides of the tracks and that there are at all times several of these driven rollers interposed between each driving ring 23 and the semi-circular end portion of the adjacent track, so that these driven rollers are tightly gripped between the rings and the tracks, and the amount of friction existing between the driven rollers, the rings and tracks, may be regulated by means of the pressure screws 28 which serve to force the rings into the adjacent rounded ends of the tracks.

The drive wheels 22 of the power units rest upon the inner peripheries of the driving rings 23, as shown in Fig. 3. The desired frictional contact between the drive wheels and the driving rings is obtained by the pivoting of the motor units in the manner shown in Fig. 6, so that the full weight of each motor unit will rest upon the drive wheels and consequently upon the driving rings, but it will be readily seen that additional weight may be placed upon the motor units if greater frictional contact between the drive wheels and driving rings is desired.

While there has been shown a pontoon structure which extends transversely of the tracks or the frame upon which the tracks are supported, it is not desired that the invention be limited to this specific construction, as it will be obvious that other types of pontoons might be employed and mounted upon the trucks 42 in a different manner from that here shown, therefore, it is to be understood that in referring, in the claims, to "buoyant bodies," there is no intention to limit the invention to the specific form of buoyant body illustrated.

Reference has been previously made to the fact that the semi-circular end portions 14 of each of the two endless tracks is of slightly greater thickness than the straight upper and lower runs 13 of the tracks, the thickness of the track being considered as extending between the grooved inner and outer faces thereof. By this thickened construction of the rounded end portions of the tracks, compensation is made for the extension of the spaced supporting rollers 46 of each truck plate 44 across the arc of the curved portion of the track as the trucks are passing around the rounded track ends, thus avoiding looseness of engagement between the trucks and the tracks and also avoiding the possibility of the truck rollers running off of the track if there should be any such looseness in the structure as would permit possible movement of the truck transversely of the tracks.

From the foregoing, it will be readily apparent that with a construction of the character herein described, when provided with a suitable hull or other similar structure upon which materials may be placed or persons may ride, transportation of such materials or persons over water or over boggy ground may be accomplished rapidly and smoothly and with less expenditure of power than would be required to move a ship of usual construction, because of the fact that in such ship of usual construction, considerable energy is wasted in forcing the body of the hull of the ship through the water, whereas in the present construction, the body of the ship is moved above the surface of the water and the means by which such movement is accomplished merely treads on the surface of the water instead of being pushed through the water. It will also be readily appreciated that a novel means has been devised for carrying the power units and for transferring power from such units to the endless tread structure made up of buoyant bodies.

By the formation of the buoyant units 30 in the manner illustrated, that is, with the straight forward or front wall 33 of one unit following behind an inclined wall 34 of the preceding unit, interference with the smooth engagement of the buoyant bodies with the water by the collecting of water between the units, is avoided, in other words, as each unit moves forwardly and downwardly around the front ends of the tracks or around the advancing end of the frame structure, the water will be pushed rearwardly and will be forced from between the descending unit and the one which is already at the lowermost elevation so that there will be no checking of the movement of the descending pontoon. This action will be of particular advantage where the tractor structure might be used in marshy ground where there would be the possibility of encountering firm bodies such as tufts of grass or the like.

What is claimed is:

1. A tractor structure, comprising an elongated horizontally disposed frame, a pair of endless tracks carried by the frame in spaced parallel relation and each having parallel upper and lower rails connected by semi-circular end rails, a plurality of tread bodies, trucks connecting the tread bodies with the frame, said tread bodies being arranged to be moved by said trucks as an endless tread lengthwise of and around the frame, roller connecting means between the trucks and said tracks, an annulus rotatably supported concentrically with and in the plane of each of said semi-circular end rails, means for establishing a driving connection between the trucks and an annulus as the trucks round the ends of the endless tracks, a power unit supported by the frame, and means for transmitting power from said power unit to an annulus.

2. A tractor structure, comprising an elongated horizontally disposed frame, a pair of endless tracks carried by the frame in spaced parallel relation and each having parallel upper and lower rails connected by semi-circular end rails, a plurality of tread bodies, trucks interposed between the tread bodies and the frame, said tread bodies being arranged to be moved by said trucks as an endless tread lengthwise of and around the frame, roller connecting means between the trucks and said tracks, the rollers of said trucks being in groups and each group being in a common plane and spaced for engagement with the inner and outer sides of a track rail, a power unit supported by and within the frame, and means for transmitting rotary motion from said power unit to those rollers of the trucks having engagement with the inner sides of the tracks.

3. A tractor structure of the character described, comprising a pair of spaced parallel endless tracks, each of said tracks having upper and lower parallel rails and semi-circular end rails, means rigidly coupling said endless tracks in spaced relation, the semi-circular end portions of one track being concentric with those of the adjacent track, a plurality of tread bodies disposed around the outer sides of said tracks and arranged in relatively closely spaced relation to constitute an endless tread longitudinally of and around the tracks, means interposed between the tread bodies and the tracks for slidably supporting the tread bodies upon the tracks, said means including inner and outer wheels arranged in a common plane and engaging inner and outer sides of the tracks, a driving ring within each semi-circular end of each track and spaced therefrom and in the plane thereof for the passage between the ring and the inner side of the track and engagement with the ring of the inner track engaging wheels, and power means for applying rotary motion to said rings.

4. A tractor structure, comprising a pair of elongated endless tracks each comprising upper and lower parallel rails and semi-circular end rails connecting the upper and lower rails, means joining said endless tracks together and maintaining the same in spaced relation with the semi-circular ends of one track concentric with the semi-circular ends of the adjacent track, a plurality of elongated tread bodies extending transversely of the outer sides of the tracks, said bodies being in relatively closely spaced parallel relation, a truck interposed between each of said bodies and the tracks and coupled with the bodies, roller elements carried by each truck and engaging the inner and outer sides of the tracks, a yieldable coupling means between the tread bodies, a power unit supported between the tracks, and means for transmitting rotary power from the power unit to those rollers of the trucks which are in engagement with the inner sides of the tracks.

5. A traversing structure of the character described, comprising an elongated endless track having upper and lower parallel rails and semi-circular end rails, an endless tread structure extending longitudinally of and encircling said endless track, said tread structure being made up of a plurality of tread bodies, a unit connected with each of said tread bodies and including a pair of roller members rotatably supported in tandem relation for engagement with the outer side of said track and a roller body rotatably supported in the plane of the first bodies for engagement with the inner side of the track, means resiliently coupling said tread bodies together, a driving ring disposed within the semi-circular end portion of said endless track concentric with said end portion and spaced therefrom, the said rollers engaging the inner side of the track passing between said driving ring and the adjacent track end portion and engaging the ring and the track, and a rotatable power wheel frictionally engaging the inner periphery of said ring for imparting rotary motion thereto.

6. A traversing structure of the character described, comprising an elongated endless track having upper and lower parallel rails and semi-circular end rails, an endless tread structure extending longitudinally of and encircling said endless track, said tread structure being made up of a plurality of tread bodies, a unit connected with each of said tread bodies and including a pair of roller members rotatably supported in tandem relation for engagement with the outer side of said track and a roller body rotatably supported in the plane of the first bodies for engagement with the inner side of the track, means resiliently coupling said tread bodies together, a driving ring disposed within the semi-circular end portion of said endless track concentric with said end portion and spaced therefrom, the said rollers engaging the inner side of the track passing between said driving ring and the adjacent track end portion and engaging the ring and the track, a rotatable power wheel frictionally engaging the inner periphery of said ring for imparting rotary motion thereto, idler rollers oscillatably supported adjacent said ring for engagement therewith upon the side thereof opposite from the adjacent track end portion, and adjustable means for shifting said idler rollers toward and away from the ring for adjusting the frictional engagement of the ring with the rollers interposed between it and the track.

7. A traversing structure, comprising a horizontally disposed elongated endless track structure having top and bottom parallel rails and semi-circular end rails connecting the top and bottom rails, an endless tread extending longitudinally of and around the endless track and including a plurality of tread bodies, a supporting truck for each tread body interposed between the same and the track, each truck including a plate member disposed adjacent to the track and rotatably supporting a pair of roller wheels having contact with the outer side of the track and a single roller wheel having contact with the inner side of the track, an articulating joint between said tread bodies, resilient means coupling the tread bodies together and normally drawing them into closely spaced relation, a driving ring disposed within an end of the endless track in concentric spaced relation with the adjacent semi-circular rail of the track, the said rollers engaging the inner side of the track passing between and contacting the track and ring, a power unit supported for rocking movement on a horizontal axis, and a driving wheel connected with said power unit and resting upon the inner periphery of said ring, said driving wheel maintaining frictional contact with the ring by reason of the weight of the unit.

8. In a structure of the character described, an elongated endless unit having horizontal upper and lower runs, means supporting said unit for continuous movement and for movement in a curved path at one end, a prime mover having a power take-off, and means disposed between said upper and lower runs for transmitting power from said take-off to the endless unit, comprising a rotary ring arranged concentrically with said curved path and in the plane thereof and rotary supporting elements forming a part of said unit and coupling the same with the supporting means, certain of said elements being disposed to engage and turn between the outer edge of said ring and the supporting means for transmitting movement to the unit and said ring having operative connection between its inner edge and said take-off.

9. In a structure of the character described, an elongated endless unit having horizontal upper and lower runs, an endless track within said unit and paralleling the said upper and lower runs and following a curved path for the support of the unit at the ends thereof, a prime mover having a power take-off, means coupling the endless unit with the track, means within the area defined by the track for transmitting power from said take-off to the means coupling the unit with the track, said last means comprising a ring supported for rotation in the plane of the endless track and concentric with said curved path and adapted to have operative engagement at its outer edge with the said means coupling the unit on the track, and said power take-off having operative connection with the inner edge of said ring for transmitting rotary motion thereto.

10. In a structure of the character described, an endless unit having horizontal upper and lower runs, an endless track within said unit and paralleling the said unit runs and having curved ends for the support of the unit at the ends thereof, rotary coupling means between said unit and the outer side of the track, a ring disposed in the plane of the track and concentric with said curved ends, a series of rotary elements coupled with the unit and engaging the inner side of the track and successively engaging the outer edge of said ring and passing between the ring and the adjacent curved end of the track, a prime mover, and a driving connection between the prime mover and the inner edge of the ring.

11. A structure as set forth in claim 10, wherein said rotary elements when in position between the ring and the adjacent curved end of the track function to maintain the ring and track separated, and means engaging the outer edge of the ring remote from the curved end of the track and urging the ring toward such curved end for the maintenance of a positive connection between the ring and those rotary elements between the ring and the track.

FRANK H. DARRAGH, Jr.